Nov. 22, 1955    H. L. MYERS    2,724,666
METHODS OF SEPARATING MATERIALS
Filed May 17, 1951
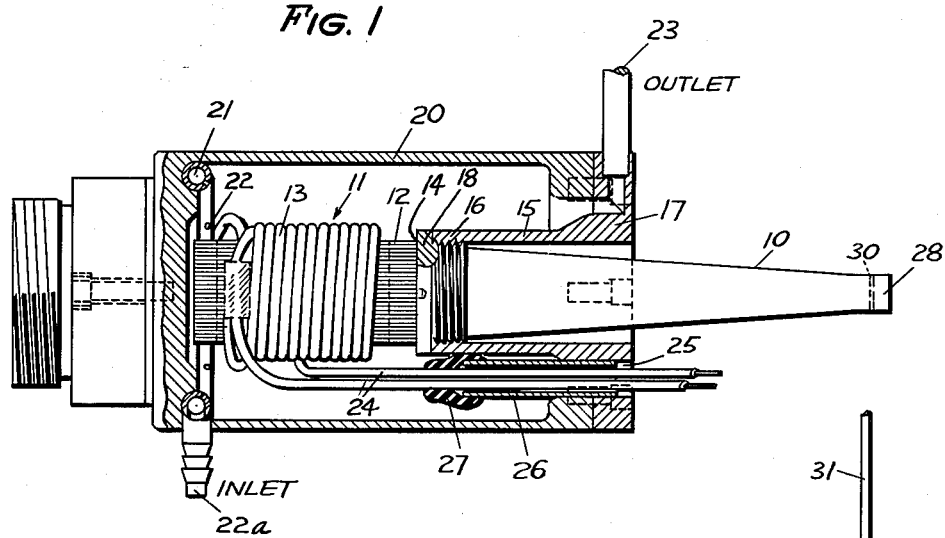
Fig. 1
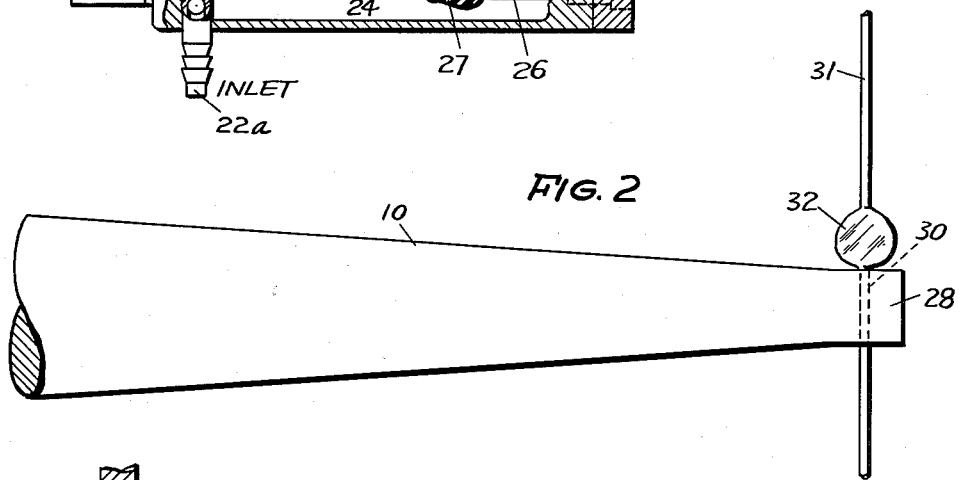
Fig. 2
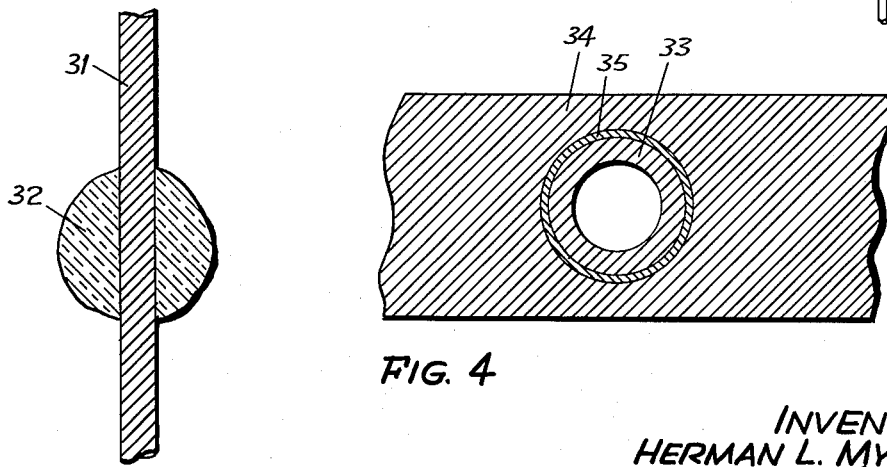
Fig. 3
Fig. 4
INVENTOR
HERMAN L. MYERS
BY Elmer J. Gorn
ATTORNEY

2,724,666

METHODS OF SEPARATING MATERIALS

Herman L. Myers, West Newton, Mass., assignor to Raytheon Manufacturing Company, Newton, Mass., a corporation of Delaware Application May 17, 1951, Serial No. 226,909

4 Claims. (Cl. 134—1)

This invention relates to methods of and apparatus for separating two pieces of material by compressional wave energy.

It is frequently necessary, particularly in salvage operations, to separate two tightly bonded materials, such as a glass bead from a tungsten rod. If, in this case, the glass bead is shattered with a hammer, the tungsten itself may be cracked and rendered useless. In other operations, it has been found difficult to separate two tightly bonded materials without destroying both.

By the present invention this possibility of damage is avoided by the application of compressional wave energy to one of the materials to be separated as, for instance, to the tungsten rod. In the case of the tungsten rod, the compressional wave energy is applied in such a manner as to set up transverse vibrations in the rod which shatter the glass and free the rod of the bead without damaging it, thus permitting the rod to be used over again.

While any convenient means for applying compressional wave energy to one of the materials to be separated may be used, it will be illustrated with the type of vibratory element disclosed in the copending application for United States patent of Carlo L. Calosi, Serial No. 195,925, filed November 16, 1950, now Patent No. 2,632,858, dated March 24, 1953.

Other and further advantages of the invention, together with various modifications thereof, will become apparent from the description of a particular embodiment which follows, reference being had to the accompanying drawings, wherein:

Fig. 1 is a side elevation partly in section illustrating an embodiment of the invention;

Fig. 2 is a detail of the tip of the vibratory system of Fig. 1 with the work piece inserted;

Fig. 3 is an enlarged cross section of the glass bead and a portion of the tungsten rod; and Fig. 4 is an enlarged sectional view of an eyelet of Kovar brazed into a piece of stainless steel.

Referring to Fig. 1, the device there shown employs a longitudinal vibratory element 10 which is driven by a magnetostrictive driving means 11, these two parts together forming a vibratory system. The driving means 11 is of a kind which is well known and consists essentially of a stack 12 of thin laminae of nickel and coils 13 of wire wound thereon which cause the laminae to undergo alternate expansions and contractions when suitably energized with polarizing direct current and alternating current of the proper frequency. The driving means 11 operates at its natural frequency with considerable force and sets the vibratory element 10 into vibration. Conveniently, the driving means 11 may have a length substantially equal to one half a wave length therein of oscillations at the operating frequency, while the vibratory element 10 may be of any integral number of one half wave lengths long. An antinode exists in this vibratory system at the region 14 where the driving means 11 is joined to the vibratory element 10.

A comparatively thin tube 15, having a length which is substantially equal to one-quarter wave length therein of vibrations at the operating frequency of the device, is connected at a first end 16 to the vibratory element 10 at the region 14 of the antinode. At the other, or second end, the tube 15 is terminated in a relatively massive ring 17 which constitutes the nonvibratory element of the device. The first end 16 of the tube 15 is slightly thickened and threaded internally, and the region 14 of the vibratory element 10 which is supported therein is correspondingly threaded for engagement therewith. An extending rim or boss 18 is provided at this end of the vibratory element. A watertight housing 20 is mounted on the nonvibratory ring 17. A tube 21 in the form of a ring and having an opening 22 therein is positioned at the top of the housing 20 and an inlet 22a for cooling fluid is connected to this tube through the wall of the housing, and an outlet 23 for cooling fluid is provided in the nonvibratory element ring 17.

The coils 13 are furnished with leads 24 which are brought through an opening 25 in the nonvibratory element, ring 17. A rigid pipe 26 is affixed in this opening and extends part way into the housing 20. For the purpose of preventing water from leaking out through the opening 25, a watertight cap 27 surrounds the leads 24 and seals the top of the pipe 26.

The relationship of this vibratory system to the work is best shown by Fig. 2. The tip 28 of the vibratory element 10 has a hole 30 drilled transversely through it. A tungsten rod 31 carrying a bead of glass 32 is inserted in this hole 30. With this arrangement the compressional wave energy produced by the transducer 11 is transmitted along the vibratory element 10 to the rod 31 where it becomes a transverse vibration along the rod.

The possible way in which this arrangement may produce the desired result can be understood by reference to Fig. 3. If the tungsten and glass are considered as having different acoustic impedances with the glass having a greater impedance, the amplitude of the vibrations in the tungsten will be greater than in the glass. The result will be that any particular portion of the metal 31 will tend to move with respect to a contacting portion of the glass 32. Such relative motion will produce the desired effect of breaking the glass away from the metal.

Another approach is to consider that the glass of the bead 32 has a lower elastic limit than the tungsten of the rod 31, or that it requires less force to reach the same limit of elasticity in the glass than in the tungsten. If either of these circumstances is the case, as vibratory energy is applied to the rod and communicated to the glass, the rod will distort more and more laterally, forcing the glass to distort with it. The glass will reach its elastic limit first and crack, leaving the rod substantially free of glass.

In a system of this type the vibratory energy is producing a stress in one direction and removing that stress and applying it in the opposite direction at a high repetitive rate. Vibratory energy at a frequency of twenty-seven kilocycles with accelerations in the order of 70,000 g's has been found suitable for this purpose. Obviously, other frequencies and accelerations could be used for separating these and other materials.

In addition to the separation of glass beads from tungsten rods, the method of the invention has been used to loosen a Kovar eyelet 33 set into a piece of stainless steel 34 with a copper braze 35, as shown in Fig. 4. For this application of the method of invention, longitudinal vibratory energy is required. For this purpose the end of the vibratory element 10 is applied directly to the eyelet. The result of the application of this longitudinal vibration to the eyelet 33 is to loosen it from the steel piece 34. Other applications of the method and purpose of the invention will occur to those skilled in the art.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. The method of separating a plurality of bonded materials of different physical characteristics comprising the steps of generating compressional wave energy axially in an elongated tapered body, inserting one of said materials to be separated into a transverse opening formed in the small end of said body, and applying said energy through the small end of said body to at least one of said materials with sufficient force to completely separate said materials.

2. The method of separating a plurality of materials offering different impedance to the passage of compressional wave energy comprising the steps of generating compressional wave energy axially in an elongated tapered body, inserting one of said materials to be separated into a transverse opening formed in the small end of said body, and applying said energy through the small end of said body to at least one of said materials with sufficient force to completely separate said materials.

3. The method of separating a plurality of materials having different elastic limits comprising the steps of generating compressional wave energy axially in an elongated tapered body, inserting one of said materials to be separated into a transverse opening formed in the small end of said body, and applying said energy through the small end of said body to at least one of said materials with sufficient force to completely separate said materials.

4. The method of separating a bead of ceramic material from a rod of metal comprising the steps of generating compressional wave energy axially in an elongated tapered body having a transverse opening in the small end to receive the said rod and inserting said rod into said opening so that compressional waves are produced transverse to the main axis of the inserted rod of sufficient force to completely separate the bead from the rod.

References Cited in the file of this patent

UNITED STATES PATENTS

| | | |
|---|---|---|
| 2,075,237 | Sexton | Mar. 30, 1937 |
| 2,200,476 | Mounce | May 14, 1940 |
| 2,283,429 | Ennis | May 19, 1942 |
| 2,293,181 | Terman | Aug. 18, 1942 |
| 2,337,186 | Caugherty | Dec. 21, 1943 |
| 2,338,165 | Caugherty | Jan. 4, 1944 |
| 2,425,868 | Dillon | Aug. 19, 1947 |
| 2,514,080 | Mason | July 4, 1950 |
| 2,530,971 | Kean | Nov. 21, 1950 |
| 2,586,745 | Tullos | Feb. 19, 1952 |
| 2,651,148 | Carwile | Sept. 8, 1953 |